F., G. & J. F. OEHLER.
ICE CUTTING MACHINE.
APPLICATION FILED MAR. 31, 1916.

1,217,337.

Patented Feb. 27, 1917.
3 SHEETS—SHEET 1.

F. Oehler
G. Oehler and
J. F. Oehler

Witnesses

Inventors by C. A. Snow & Co.

Attorneys.

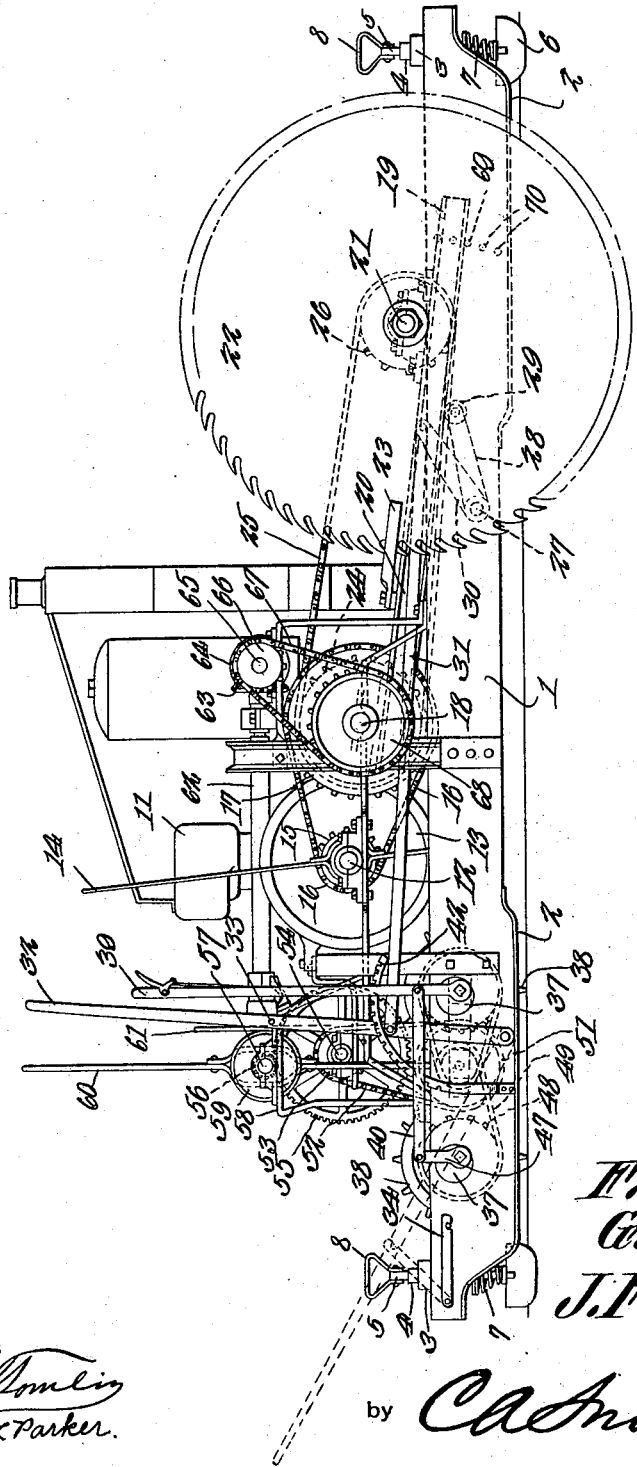

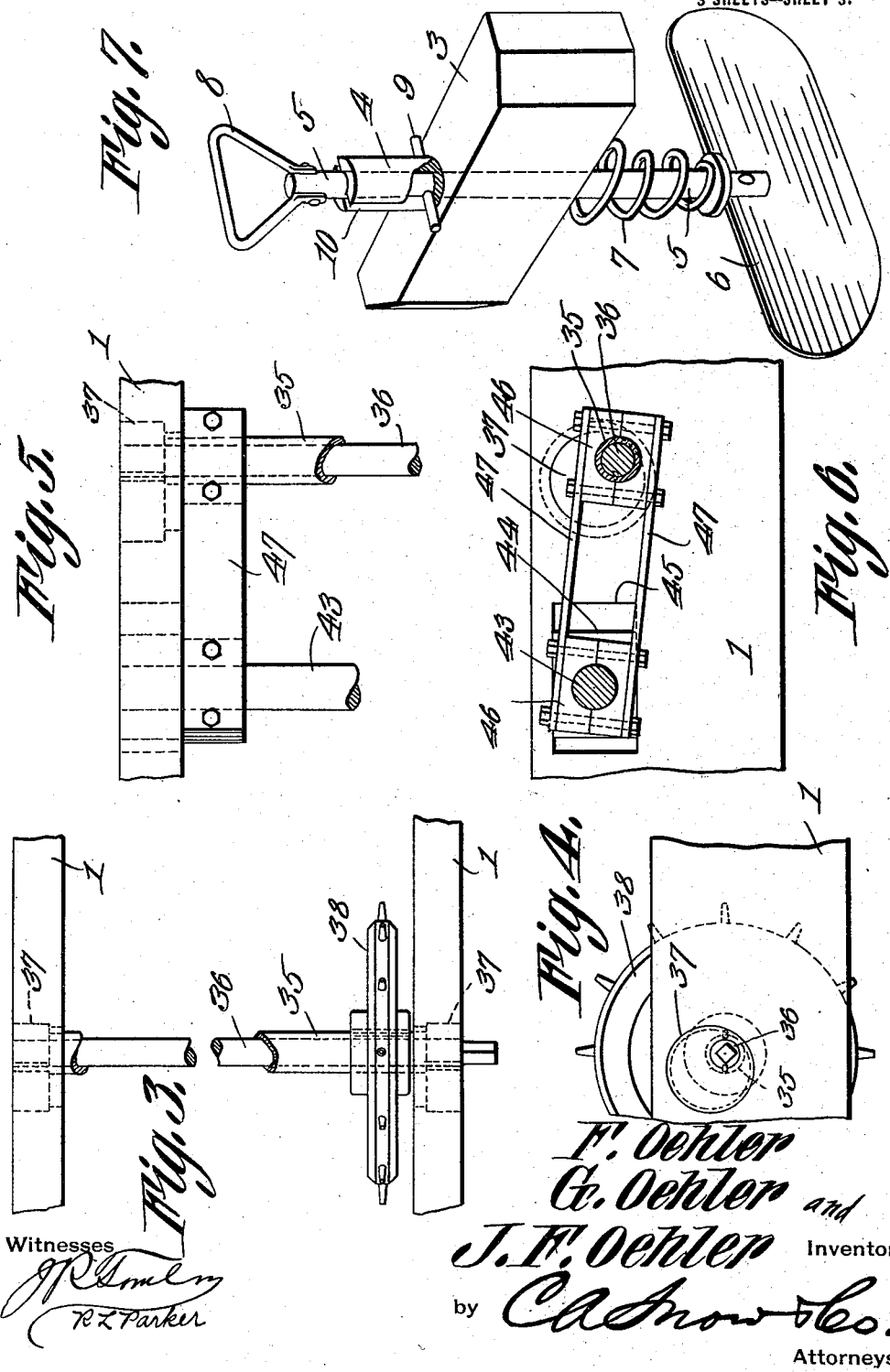

UNITED STATES PATENT OFFICE.

FRED OEHLER, GUSTAVE OEHLER, AND JOHN F. OEHLER, OF SHELBY, WISCONSIN.

ICE-CUTTING MACHINE.

1,217,337.   Specification of Letters Patent.   Patented Feb. 27, 1917.

Application filed March 31, 1916. Serial No. 88,075.

*To all whom it may concern:*

Be it known that we, FRED OEHLER, GUSTAVE OEHLER, and JOHN F. OEHLER, citizens of the United States, residing at Shelby, in the county of La Crosse, State of Wisconsin, have invented a new and useful Ice-Cutting Machine, of which the following is a specification.

The present invention appertains to ice cutting machines, and aims to provide a novel and improved machine for cutting or sawing ice, whereby to provide a labor saving appliance by means of which the ice can be cut quickly and effectively.

One of the objects of the invention is to provide an ice cutting machine having novel means for propelling it over the ice, including means for adjusting said means toward and away from the ice, whereby the machine will be propelled properly under various conditions.

Another object of the invention is the provision of novel means for mounting the saw, and for adjusting it to various depths and to raise it above the ice.

A further object of the invention is the provision in an ice cutting machine of novel, yet simple and efficacious means for guiding the machine along the ice by means of the cuts previously made, whereby the cuts will be parallel with one another.

It is also within the scope of the invention to provide an ice cutting machine which is improved generally in its construction and details, to enhance the utility and efficiency thereof, and whereby the machine can be operated by one operator.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawings, wherein:—

Fig. 2 is a side elevation thereof.

Fig. 3 is a fragmental plan view showing one of the propeller shafts and one of its propelling wheels.

Fig. 4 is an elevation of the parts shown in Fig. 3.

Fig. 5 is a fragmental plan view showing the device for connecting one of the propeller shafts and accompanying counter shaft.

Fig. 6 is an elevation of the parts shown in Fig. 5.

Fig. 7 is a perspective view of one of the guiding devices.

Figure 8:
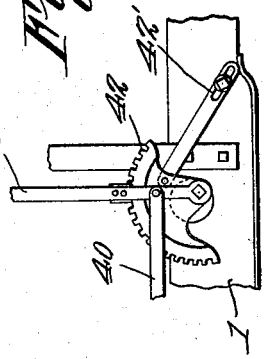
Fig. 8 is a detail view showing a modification.
Figure 1:
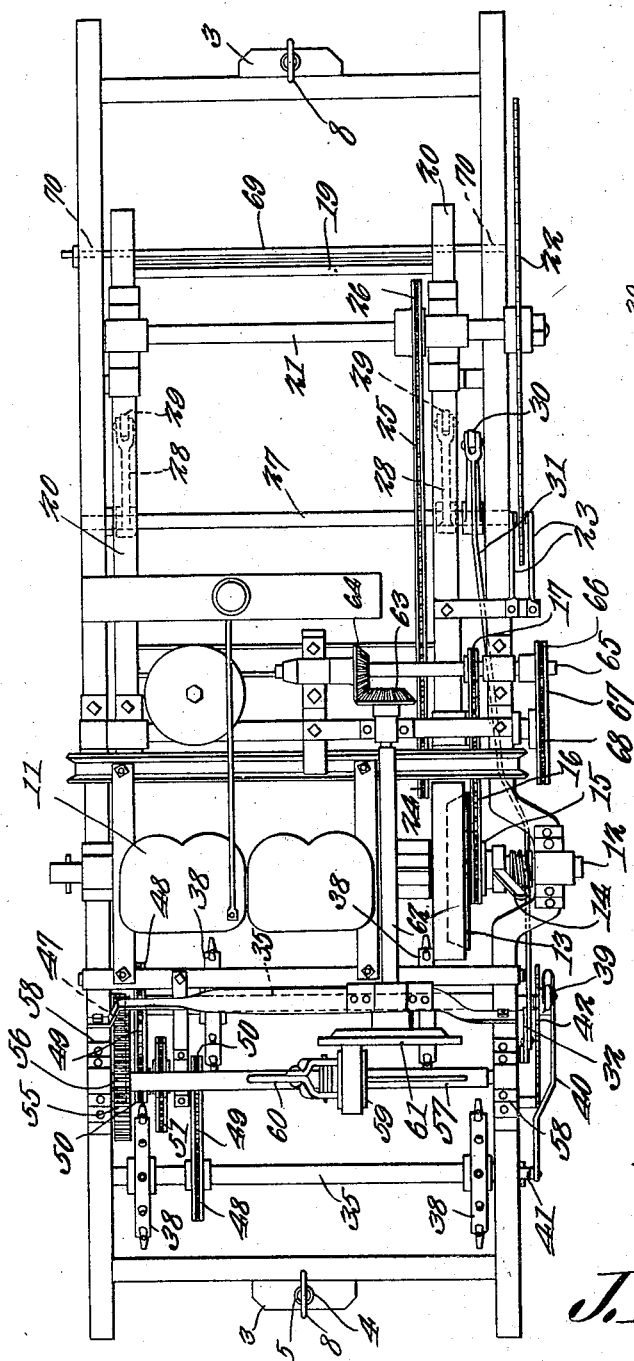
Figure 1 is a plan view of the machine.

In carrying out the invention, there is provided a frame 1 of suitable construction and having suitable bearings for the various shafts. The side beams of the frame are provided adjacent their forward and rear ends with runners 2 adapted to run on the ice.

In order to guide the frame 1 for proper movement over the ice, guiding devices are carried by the ends of the frame. Each of these devices embodies a block 3 attached to one end of the frame intermediate the side beams thereof, and the block 3 has secured thereto an upstanding tubular standard 4. A vertical shank 5 is slidable and rotatable within the block and its standard 4, and has secured to its lower end a guide blade 6 adapted to run in the cut or kerf last formed in the ice by the saw, as will hereinafter more fully appear. A coiled spring 7 is disposed between the block 3 and blade 6, to yieldably depress said blade, and the upper end of the shank 5 has a handle 8 to enable said shank to be raised, whereby to retract the blade 6 from the ice against the tension of the spring 7. A diametrical pin 9 projects from and is engaged rigidly through the shank 5 and works vertically within a relatively long vertical diametrical slot 10 with which the standard 4 is provided, in order to hold the blade 6 in longitudinal position when it is depressed. By raising the shank 5 through the medium of the handle 8, the pin 9 can be lifted out of the slot 10, and then by turning the handle, the pin 9 is able to seat upon the upper end of the standard 4, thus holding the blade 6 in raised position above the ice, in order that the frame can be readily moved about upon the ice without interference. As soon as the handle 8 is turned to move the pin 9 into alinement with the slot, the blade 8 will be depressed by its spring to enter the slot or cut in the ice.

An internal combustion engine 11 or other suitable prime mover is carried by the frame for propelling it, and for operating the saw, and this engine 11 rotates a driving shaft 12 through the medium of a conical clutch 13 controlled by a hand lever 14 within reach of the operator at the rear end of the frame. A sprocket wheel 15 is secured upon the shaft 12 and is connected by a sprocket chain 16 with a sprocket wheel 17 secured upon a transverse shaft 18 journaled upon the frame intermediate its ends, and a forwardly projecting oscillatory saw frame 19 is swingably mounted upon the shaft 18. The frame 19 comprises side arms 20 movable up and down, and a transverse saw shaft 21 is journaled upon the arms 20 adjacent their forward free ends, and has a circular rotary saw 22 secured to one end thereof at one side of the frame. Suitable guides 23 can be used to prevent the excessive vibration or lateral displacement of the saw, and the saw can be guarded or shielded in any suitable manner. The saw shaft 21 is driven from the shaft 18, and for this purpose, a sprocket wheel 24 is secured upon the shaft 18 and is connected by an endless sprocket chain 25 with a sprocket wheel 26 secured upon the shaft 21. Thus, the clutch 13 in being thrown in, will rotate the shaft 12, which in turn rotates the shaft 18, resulting in the shaft 21 being rotated for operating the saw. The saw is disposed in a longitudinal vertical plane spaced suitably from the longitudinal vertical plane of the guide blades 6, whereby a strip of ice the proper width is cut by the machine.

As a means for raising and lowering the frame 19, a transverse rock shaft 27 is journaled to the side beams of the frame 1 below the frame 19 and between the ends thereof, and forwardly projecting arms 28 are secured to the shaft 27 and are provided with rollers 29 at their free ends bearing upwardly against the arms 20. A third arm 30 is secured to the shaft 27 and is connected by a bar or link 31 with a hand lever 32 fulcrumed to one side beam of the frame adjacent the rear end thereof within convenient reach of the operator. When the lever 32 is swung rearwardly, it pulls the link 31 and arm 30 in the same direction, thereby raising the arms 28, which raises the arms 20, so that the saw shaft 21 is raised to remove the saw from the ice and hold it in inoperative position. The lever 32 can be held in rearwardly moved position, by means of an outstanding pin or lug 33 carried by the lever 32 with which is engageable a hook or catch 34 pivoted to the rear end of the respective beam of the frame. This will hold the saw in raised position, and when the hook or catch 34 is released, the lever 32 can be swung forwardly whereby the arms 28 are moved downwardly to permit the saw frame 19 to gravitate, thereby bringing the saw into engagement with the ice.

Coming to the propelling mechanism, the same is carried by the rear portion of the frame, and includes a pair of longitudinally spaced transverse tubular shafts 35 mounted for rotation upon shafts 36, which have their terminals secured to eccentrics 37 mounted for rotation within the side beams of the frame. Propelling wheels 38 are secured upon the shafts 35, and are provided with spurs to engage the ice, to facilitate traction, there being preferably a pair of propelling wheels for each shaft 35. The shafts 36 are oscillated to adjust the wheels 38 relative to the ice, and this is accomplished by means of an upwardly projecting hand lever 39 attached to one terminal of the forward shaft 36, and connected by a link 40 with an arm 41 secured to the corresponding terminal of the rear shaft 36. When the lever 39 is swung, it rotates the shafts 36, thereby rotating the eccentrics 37 and resulting in the shafts 36 together with the shafts 35 being moved either toward or away from the ice to adjust the wheels 38 correspondingly. The spurs of the wheels 38 can thus be forced farther into or removed from the ice, to facilitate the propulsion of the machine, according to various conditions. A segment 42 is secured to the frame to hold the lever 39 in various positions.

In order to rotate the shafts 35, a transverse counter shaft 43 is disposed between the transverse shafts 35, and has its ends journaled in bearings 44 slidable longitudinally in slots 45 with which the side beams of the frame 1 are provided. In order to hold the counter shaft 43 properly spaced relative to the forward shaft 35, when the shafts 35 are adjusted, clamps 46 rotatably embrace the counter shaft 43 and forward shaft 35 adjacent one side of the frame, and have attached thereto bars 47. Thus, when the forward shaft 35 is adjusted, the counter shaft 43 will be slid to remain the proper distance from the shaft 35, whereby to prevent interference with the operative connection between said shafts.

The shafts 35 are operatively connected with the counter shaft 43 by means of sprocket wheels 48 secured upon the shafts 35 and connected by endless sprocket chains 49 with sprocket wheels 50 secured upon the shaft 43. The shaft 43 is in turn connected with a transverse shaft 54 journaled to the frame above the shaft 43, a sprocket wheel 51 being secured upon the shaft 43 and being connected by an endless sprocket chain 52 with a sprocket wheel 53 secured upon the shaft 54. A relatively large gear wheel 55 is secured upon the shaft 54 and meshes with a pinion 56 secured upon a transverse shaft 57 journaled upon standards 58 carried by the frame. Thus, a suitable gear train is provided between the shafts 57 and propeller shafts 35, in order that the propeller shafts will rotate much slower than the shaft 57 and engine, a proper gear ratio being provided.

A variable speed transmission mechanism is disposed between the driving mechanism and engine, and to this end a friction wheel 59 is feathered upon the shaft 57 and bears against the face of a friction disk 61 secured to the rear end of a longitudinal shaft 62 journaled to the frame. The friction wheel 59 is shifted by means of a lever 60 under the control of the operator. The forward end of the shaft 62 has a bevel gear 63 meshing with a bevel gear 64 secured upon a counter shaft 65, and a sprocket wheel 66 secured to said shaft 65 is connected by an endless sprocket chain 67 with a sprocket wheel 68 secured to the shaft 18. Thus, the shaft 18 operates the shaft 65, which in turn operates the shaft 62 and its friction disk 61. The disk 61 rotates the friction wheel 59 and its shaft 57, from which the power is transmitted to the propelling wheels. By shifting the friction wheel 59, the speed of rotation of the shaft 57 is controlled, to govern the velocity of the machine, and to enable the same to be moved either forwardly or backwardly.

In order to support the saw frame 19 at different positions, to regulate the depth of the cut made by the saw, a transverse rod 69 is insertible through apertures 70 provided in the side beams of the frame below the free ends of the arms 20. The rod 69 can be adjusted vertically, to support the free end of the frame 19 in various vertical positions, whereby to support the saw at various vertical positions.

The operation of the machine will be obvious to those skilled in the art, from the foregoing, but briefly stated is as follows: Before starting a cut in the ice, the machine is shifted to bring the guide blades 6 over the cut previously made, the blades 6 being raised during the shifting of the machine, and then lowered to engage in the slot or cut, whereby to guide the machine along said cut, when the clutch 13 is thrown in to operate the driving or propelling mechanism, which will propel the machine over the ice, the speed being controlled by the friction wheel 59. During the shifting of the machine from one position to another, the saw is in raised position above the ice, and when the machine is started in its new position, the saw is lowered to cut the ice on a line parallel with the cut previously made. The rod 69 can be adjusted to support the saw at the proper vertical position, to regulate the depth of cut. The machine can move either forwardly or backwardly, and need not be turned around at the end of the field of ice being cut. The various mechanisms are readily controlled, and the machine has proved, by actual tests, to do the work of a large number of men, in supplanting the ordinary manual sawing of the ice.

The saw frame instead of being fulcrumed upon the counter shaft 18, can be fulcrumed to the frame in any suitable manner.

Fig. 8 illustrates the preferred manner of mounting the segment 42. Thus, the segment is mounted upon and carried by the respective shaft 36, to be moved therewith, and is provided with a slotted arm or extension 42' engaging the main frame to prevent the segment from rotating.

Having thus described the invention, what is claimed as new is:

1. An ice cutting machine embodying a frame, an ice cutting saw carried thereby, a block carried by the frame and having an upstanding tubular standard provided with a relatively long slot, a vertical shank slidable and rotatable through said block and standard and having a guide blade at its lower end to work within a cut previously formed in the ice, a spring for depressing the blade, and a rigid pin projecting from the shank working in said slot to hold the blade in longitudinal position when it is lowered, said pin being seatable upon the standard when the shank is raised and turned to support the blade in raised position.

2. An ice cutting machine embodying a frame, an ice cutting saw carried thereby, eccentrics carried by the frame, a shaft secured to said eccentrics, propelling means rotatable upon said shaft, a slidably mounted counter shaft carried by the frame and operatively connected with the propelling means, means for rotating the counter shaft, and means connecting said shafts for holding them properly spaced at the various positions of the first mentioned shaft.

3. An ice cutting machine embodying a frame, rotatable eccentrics carried thereby, a shaft having its terminals secured to said eccentrics, means for rotating said eccentrics and shaft, a tubular shaft rotatable upon the aforesaid shaft, propelling wheels carried by the tubular shaft, slidable bearings carried by the frame, a counter shaft journaled in said bearings and operatively connected with the tubular shaft, means for rotating the counter shaft, and means connecting the tubular and counter shafts for holding them properly spaced at the various positions of the first mentioned shaft.

4. An ice cutting machine embodying a frame having side beams, pairs of rotatable eccentrics carried by said beams, a pair of shafts terminally secured to said eccentrics and disposed transversely of the frame, manually-operable means for rotating said eccentrics and shafts, tubular shafts rotatable upon the aforesaid shafts, ice-engaging propelling wheels mounted upon the tubular shafts, slidable bearings carried by said beams between the aforesaid shafts, a counter shaft journaled in said bearings between the aforesaid shafts and operatively connected with the tubular shafts, means connecting one of the tubular shafts and counter shaft for holding them properly spaced relative to one another at the various positions of the first mentioned shafts, and a driving mechanism carried by the frame and operatively connected with the counter shaft.

In testimony that we claim the foregoing as our own, we have hereto affixed our signatures in the presence of two witnesses.

FRED OEHLER.
GUSTAVE OEHLER.
JOHN F. OEHLER.

Witnesses:
FRANK WINTER,
W. WINTER.

Copies of this patent may be obtained for five cents each, by addressing the "Commissioner of Patents Washington, D. C."